United States Patent
Gallet et al.

(10) Patent No.: US 8,596,603 B2
(45) Date of Patent: Dec. 3, 2013

(54) SUSPENSION RODS FOR THE BYPASS FLOW DUCT OF A TURBOJET WITH ECCENTRIC BALL JOINTS

(75) Inventors: Francois Gallet, Moissy-Cramayel Cedex (FR); Daniel Thomas Gerard Riviere, Moissy-Cramayel Cedex (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 13/465,302

(22) Filed: May 7, 2012

(65) Prior Publication Data

US 2012/0286126 A1    Nov. 15, 2012

(30) Foreign Application Priority Data

May 9, 2011    (FR) ...................................... 11 53947

(51) Int. Cl.
*F16M 13/00*    (2006.01)
(52) U.S. Cl.
USPC ............ 248/610; 248/554; 244/54; 244/53 R; 60/796
(58) Field of Classification Search
USPC .............. 248/49, 610, 612, 581, 589; 60/796, 60/797; 244/54, 53 R
See application file for complete search history.

(56) References Cited

U.S. PATENT DOCUMENTS 4,915,585 A * 4/1990 Guimbal ........................ 416/140
6,296,203 B1 10/2001 Manteiga et al.
6,330,995 B1 * 12/2001 Mangeiga et al. ............ 248/554
2004/0216461 A1 11/2004 Wallace et al.
2008/0156930 A1 7/2008 Audart-Noel et al.
2010/0290903 A1 11/2010 Heyerman et al.

FOREIGN PATENT DOCUMENTS

| EP | 1 129 942 A2 | 9/2001 |
| EP | 1 473 441 A2 | 11/2004 |
| EP | 2 251 540 A2 | 11/2010 |
| FR | 2 887 853 | 1/2007 |

OTHER PUBLICATIONS

French Preliminary Search Report issued Dec. 9, 2011, in French 1153947, filed May 9, 2011 (with English Translation of Categories of Cited Documents).

* cited by examiner

*Primary Examiner* — Daniel J Troy
*Assistant Examiner* — Asha Puttaiah
(74) *Attorney, Agent, or Firm* — Oblon, Spivak, McClelland, Maier & Neustadt, L.L.P.

(57) ABSTRACT

A device for assembly of a connecting rod on the casing of a turbo-engine including: a clevis fixed to the casing and including at least two coaxially bored lugs; a shaft traversing the bores of the lugs to which the suspension member is fixed, in a manner which is mobile in radial rotation, via a ball joint surrounding the shaft; and a connecting device which holds the shaft in place in the lugs of the clevis and is capable of being driven in rotation about the axis of the bores, is disclosed. The ball joint and the connecting device are configured such that the rotation of the connecting device about the axis of the bore of the lugs causes an offset of the axis of rotation of the connecting rod in a direction perpendicular to the axis of the bores.

7 Claims, 3 Drawing Sheets

SUSPENSION RODS FOR THE BYPASS FLOW DUCT OF A TURBOJET WITH ECCENTRIC BALL JOINTS

BACKGROUND OF THE INVENTION

The field of the present invention is that of turbojets and members providing the connection between the various parts thereof. The invention relates more particularly to members providing the mechanical support of the bypass flow duct of bypass engines.

A propulsion engine, such as a turbojet, may be mounted in various locations of the aircraft, by fastening onto a mast or a pylon belonging to the structure thereof. It may also be suspended below the wings, fixed to the fuselage, generally at the rear, or mounted in the tail unit by appropriate fastening means. Said fastening means have the function of ensuring the transmission of mechanical forces between the engine and the structure of the aircraft. The loads to be taken into account are, in particular, the weight of the engine along the vertical Z-axis, its thrust along the X-axis of the engine and the lateral aerodynamic loads along the transverse Y-axis. The loads to be transmitted also include the torque pick-up about the shaft of the engine. Said means also have to absorb the deformations to which the engine is subjected during the different phases of the flight which result, for example, from dimensional variations due to thermal expansion or contraction, without transmitting said deformations to the mast.

A method of suspension, for example in the case of a turbo-fan engine, consists in fastening the engine to a mast belonging to the structure of the wing of the aircraft by a front suspension or front fixing and a rear suspension or rear fixing. The front suspension is fixed, in particular, to the intermediate casing downstream of the fan casing and the rear suspension to the exhaust casing of the primary flow. Said two parts constitute the structural elements of a turbo-engine, on which all the forces are absorbed.

Modern turbojets are bypass turbo-engines with a high by-pass ratio, the secondary air flow being compressed by a single compressor stage known as the fan. At the outlet of this stage the air flow is guided by a duct directly into a nozzle to contribute to the thrust of the engine. It circulates, therefore, between the principal body of the engine defined by the casings and a bypass flow duct (generally denoted by the English acronym OFD for Outer Fan Duct). For reasons of mass, said duct is commonly made from composite material. The fixing of said duct to the engine is carried out by connections at its two longitudinal ends, a first fixing being carried out upstream on the casing surrounding the fan and a second fixing to the rear on a support ring carried by the exhaust casing.

The connection between the support ring and said exhaust casing is generally carried out by means of arms which pass through the bypass flow. In more recent embodiments, said connection may also be provided by profiled connecting rods, fixed, on the one hand, to the bypass flow duct and, on the other hand, to the exhaust casing, which permits a significant reduction in the mass of this connection. In this case of carrying out the fixing by connecting rods, the connection is made by a framework of connecting rods, which are generally six or eight in number and aligned in pairs, and which are attached at three or four points to the support ring, as shown in FIG. 2.

Such an assembly is intentionally hyperstatic, in particular to ensure redundancy in the case of rupture of one of said elements. The drawback with such a choice is that the system is difficult to mount and it is necessary to provide devices for adjusting the length of the connecting rods, without which the mounting becomes impossible. Thus it is necessary to provide a system for adjusting the position of the ball joints as a function of the length of the connecting rods, to take into account the manufacturing tolerances of each of the connecting rods and clevises of the exhaust casing and, if required, to provide them with pre-stressing during the mounting.

DESCRIPTION OF THE PRIOR ART

In the prior art, numerous devices for adjusting the length of the connecting rods have been conceived, such as for example those which provide a shaft carrier part screwed to one of the ends thereof; in this case the adjustment takes place by rotating said part by one or more half-turns about the principal axis of the connecting rod. To be able to obtain a precise adjustment it is thus necessary to produce a thread with a very fine pitch which complicates the production of the connecting rod and constitutes a system which is not particularly robust in terms of mechanical strength.

The object of the present invention is to remedy said drawbacks by proposing a device for adjusting the length of the connecting rod which is simple to implement and which ensures an adjustment of the length which is perfectly adapted to requirements.

SUMMARY OF THE INVENTION

To this end, the subject of the invention is a device for assembly of a suspension member on the casing of a turbo-engine comprising, in addition to said suspension member, a clevis fixed to the casing and comprising at least two coaxially bored lugs, and a shaft traversing the bores of said lugs to which said suspension member is fixed, in a manner which is mobile in radial rotation, via a fixing means surrounding the shaft, said shaft being held in place in the lugs of said clevis by connecting means capable of being driven in rotation about the axis of said bores, characterized in that said fixing means and said connecting means are configured such that the rotation of said connecting means about the axis of the bore of the lugs causes an offset of the axis of rotation of the suspension member in a direction perpendicular to said axis of the bores.

The offset created by the rotation of the connecting means permits the compensation of clearance left during the mounting of the suspension member and its pre-stressing to avoid peening of the parts due to vibrations.

In a preferred embodiment, the fixing means is a ball joint fixed at one of the ends of said suspension member, and bored along an axis which is offset relative to the axis of symmetry of its spherical part, the axis of rotation of said connecting means being merged with the axis of the bore of said lugs.

Advantageously, the ball joint comprises at least one cutout on a radial face facing said connecting means and in which said connecting means comprise a longitudinal extension capable of cooperating with said cutout to fix in rotation said ball joint with said connecting means, about the axis of the bore of said lugs.

Preferably, the connecting means comprise a bushing and a support ring for said extension, both extending about the support shaft of said suspension member and comprising means for reciprocal fixing in rotation, said bushing and said ring each comprising a radial shoulder configured to be positioned on both sides of one of the lugs of the clevis.

Preferably, the ring comprises two longitudinal extensions located on both sides of the radial shoulder thereof, a first longitudinal extension being capable of cooperating with the cutout of the ball joint and a second longitudinal extension being capable of cooperating with a cutout formed in said bushing.

Advantageously, said bushing comprises two parallel flat portions positioned on its circumference, permitting its rotation using a tool about the axis of the bore of said lugs.

Preferably, the support shaft is hollow and traversed by an assembly consisting of a screw and a nut capable of providing the clamping of the radial shoulder of said bushing against the corresponding lug of the clevis, so as to block the rotation of the bushing about the axis of the bore of said lugs.

More preferably, the device further comprises a washer positioned between the bushing and the nut, said washer comprising two parallel flat portions capable of being positioned opposite the flat portions of said bushing.

In an alternative embodiment, said connecting means are bored along an axis offset relative to the axis of the bore of said lugs in a direction perpendicular thereto.

The invention also relates to a turbo-engine comprising a device for assembly as disclosed above.

The invention will be understood more clearly and further objects, details, features and advantages thereof will appear more clearly during the following detailed explanatory description of an embodiment of the invention given by way of purely illustrative and non-limiting example, with reference to the accompanying schematic drawings.

DESCRIPTION OF THE PREFERRED EMBODIMENTS

Figure 1:
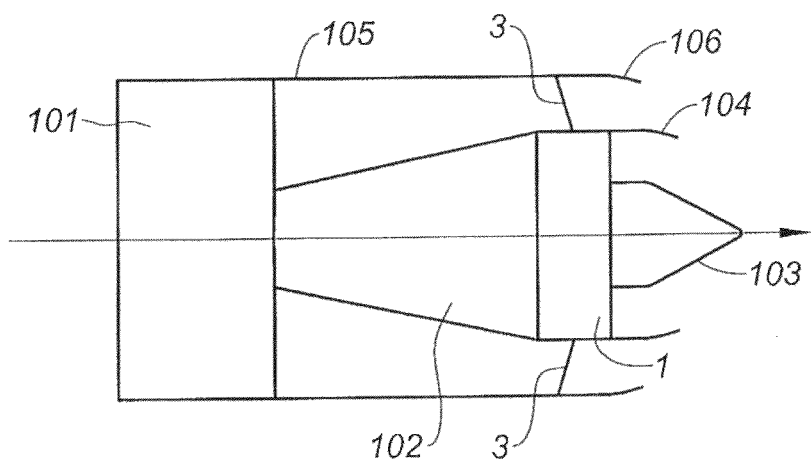
FIG. 1 is a schematic view of a bypass turbojet, with a connection via connecting rods between the exhaust duct and the bypass flow duct.

With reference to FIG. 1, a stylized view of a bypass turbojet may be seen, comprising a fan 101, a primary body 102 comprising downstream thereof an exhaust casing 1 which forms part of the structure of the engine, and a rear cone 103. The primary flow which passes through the primary body is ejected into a primary nozzle 104 surrounding the rear cone, whilst the secondary flow which originates from the fan is guided downstream thereof by a bypass flow duct 105 terminated by a secondary nozzle 106. The bypass flow duct 105 is attached to the exhaust casing 1 by a framework of connecting rods 3 which are inclined relative to a radial plane of the engine, the fixing to the bypass flow duct being positioned upstream relative to that on the exhaust casing.

Figure 2:
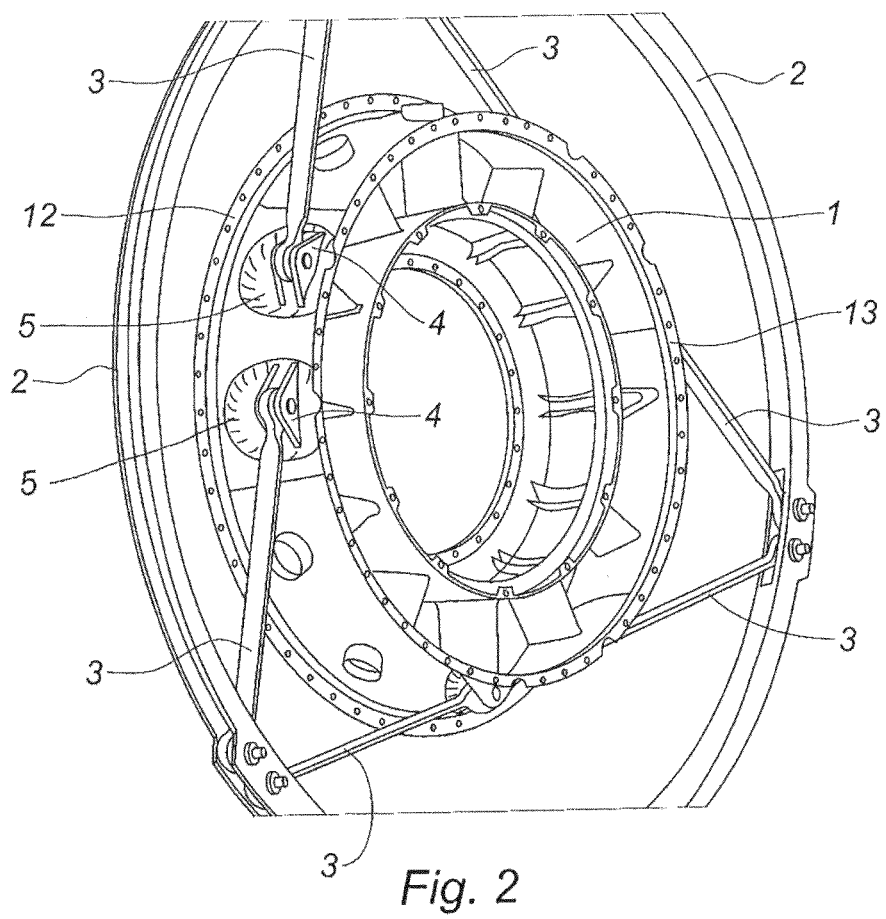
FIG. 2 is a perspective view of an exhaust casing and the support ring of the bypass flow duct of a turbojet.

With reference to FIG. 2, an exhaust casing 1 of a turbojet is seen surrounded by a support ring 2 designed to retain the bypass flow duct 105 of said turbojet. Said forces associated with this retention are transmitted to the exhaust casing by a set of six connecting rods 3 which are fixed at one of their ends to the ring 2 and at the other end to the exhaust casing 1 by fixings in the form of clevises. As shown in the figure, the connecting rods 3 are arranged in pairs, tangentially to the exhaust casing 3 and thus form a triangle of which the apexes are located on the support ring 2.

Figure 3:
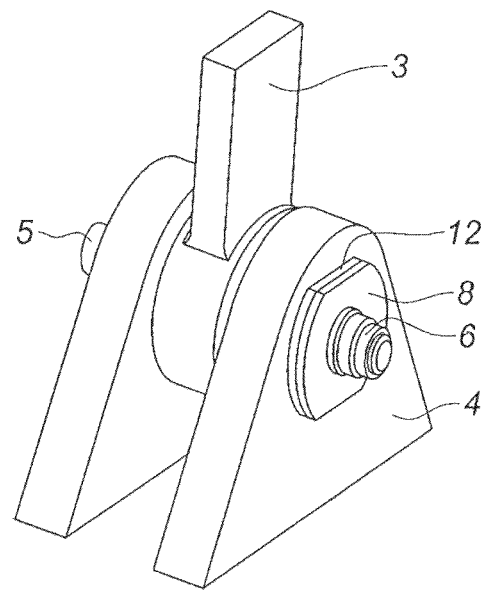
FIG. 3 is a perspective view of the end of a connecting rod for supporting a turbojet and its fixing clevis, according to an embodiment.

FIG. 3 shows a connecting rod 3 installed in a clevis 4 according to the invention, fixed to the exhaust casing 2. The clevis and the connecting rod are traversed by a screw 5 which is clamped against the lugs of the clevis 4 via a nut 6. A first conventional washer 7 is positioned between the head of the screw 5 and a first lug of the clevis whilst a second washer 8 having on its periphery two parallel flat portions is positioned between the second lug of the clevis 4 and the nut 6.

Figure 4:
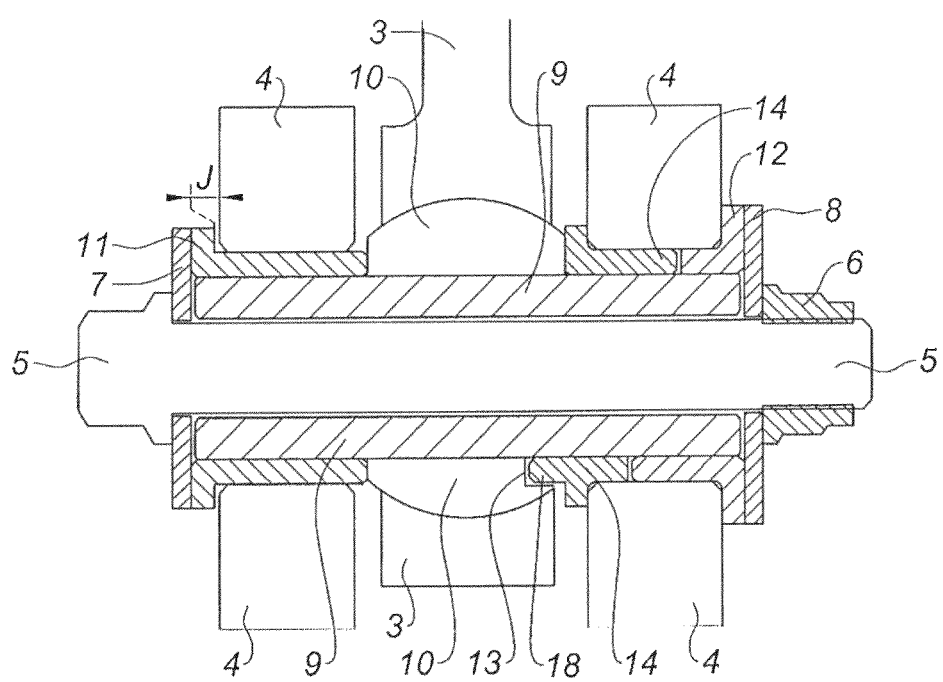
FIG. 4 is a sectional view of the connecting rod and of the clevis of FIG. 3.

With reference to FIGS. 3 and 4, the clevis 4 is seen, the lugs thereof each being perforated by a bore through which a traversing shaft 9 passes. Said shaft is hollow and is in turn traversed on both sides by the screw 5, which is free in terms of rotation in the shaft 9.

The connecting rod 3, as explained above, is a pivoting connecting rod, i.e. it is connected to the shaft 9, about which it pivots, by a ball joint 10. The connection between the connecting rod 3 and the ball joint 10 is a free connection, the connecting rod being able, on the one hand, to rotate about the ball joint in a plane vertical to the shaft 9 of the clevis 4, and on the other end, to have misalignments relative to said vertical plane. It is noteworthy that the bore formed in the ball joint 10 to permit the shaft 9 to pass through is not aligned with the axis of symmetry of its spherical shape. Said hole is off-centered in a direction perpendicular to the support shaft 9 of the connecting rod or the screw 5 so that a rotation of the ball joint 10 is associated with the connecting rod moving further away or closer relative to the axis of the bore of the lugs of the clevis 4. The connection between the ball joint 10 and the shaft 9 is also a connection which is free in terms of rotation, the ball joint being able to rotate about said shaft 9 in the absence of a blocking device formed by a dog-clutch as explained below.

The support shaft 9 is held laterally in position, in the conventional manner, by bushings which slip over the shaft and extend radially, on the side of their external end, via shoulders which bear against external lateral faces of the lugs of the clevis 4. The first and second washers 7 and 8 are then placed outside the shoulders of said bushings to retain them in translation, in the same manner as the shaft 9, and thus permit the fixing of the assembly formed by the shaft 9, the bushings 11 and 12 and the washers 7 and 8, by tightening the screw 5 and the nut 6.

The first bushing 11 located on the side of the screw head 5 is a conventional bushing of which the longitudinal part bears directly against a radial face of the ball joint 10 of the connecting rod 3, whilst the second bushing 12 located on the side of the nut 6 is an engaged bushing which bears against the other radial face of the ball joint 10 only by means of an annular part, known as a dog-clutch 14, which will be described in more detail with reference to FIG. 5.

The ball joint 10 has, on the side of the engaged bushing 12 and the dog-clutch 14, an indentation 13 which is hollowed out of the radial face thereof so as to form a housing for a longitudinal extension of the dog-clutch 14, of which the cooperation with the indentation 13 ensures the fixing in rotation of the ball joint 10 and said dog-clutch 14.

Figure 5:
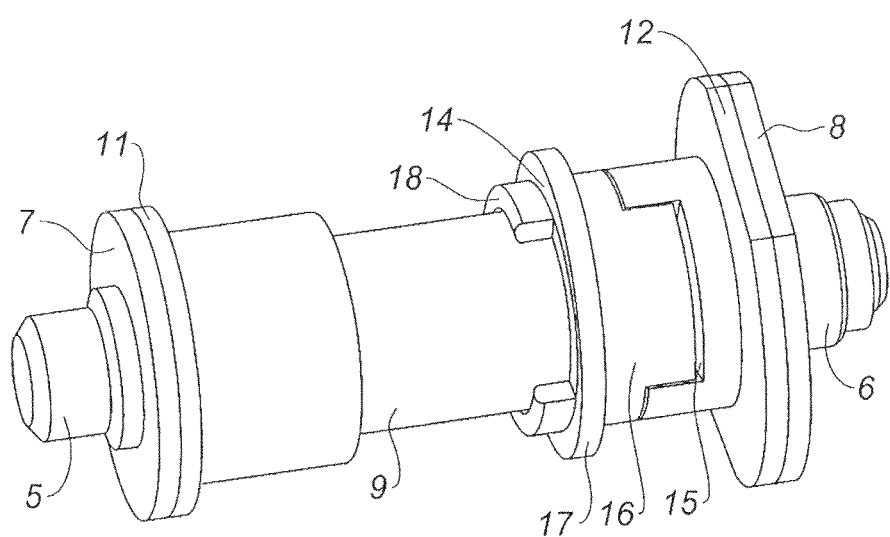
FIG. 5 is a perspective view of the screw of the clevis of FIG. 3 and its bushings.

With reference now to FIG. 5, starting from the right of the figure the second washer 8 is seen, said washer carrying two parallel flat portions on its circumference, for the purpose of being able to be driven in rotation using a wrench.

The shoulder of the second bushing which bears against the external face of the second lug has in turn two flat portions, which are identical to those of the second washer 8 such that said two parts may be driven simultaneously in rotation by the same wrench. The longitudinal part of the second bushing 12 has a cylindrical shape which surrounds the shaft 9 and has at its end one or two rectangular cutouts 15 located symmetrically relative to one another, for the purpose of providing a housing with one or two longitudinal extensions, called the second extensions 16 of the dog-clutch 14.

The dog-clutch 14 has an annular shape surrounding the support shaft 9 and has a shoulder or collar 17 extending radially and from which two extensions extend longitudinally on both sides of the collar 17. Said longitudinal extensions each have the shape of a cylindrical angular sector, of which the amplitude corresponds to that of the cutouts made for the first extension 18 in a radial face of the ball joint 10 and for the second extension 16 in the second bushing 12. During the mounting of the assembly, the penetration of the first and second longitudinal extensions 18 and 16 of the dog-clutch, respectively, in the cutouts 13 and 15, of the ball joint 10 and of the second bushing 12 permit the fixing in rotation about the shaft 9 of the ball joint 10 with the dog-clutch 14 and with the bushing 12. By preventing any possibility of rotation to the second bushing 12 via a simple wrench, it is thus possible to immobilize the ball joint 10 in rotation about the shaft 9.

On the opposing side, i.e. on the side of the screw head, without the choice of the side which carries the cutouts and the longitudinal extensions having any importance, there is no part forming the dog-clutch, the radial face of the ball joint 10 not having a cutout and the first bushing 11 not having any longitudinal extension. The first bushing 11 bears against the first lug of the clevis by its radial shoulder whilst its longitudinal part traverses the first lug of the clevis 4 over its entire thickness to come directly into contact with the radial face of the ball joint 10; in contrast, on the side of the screw head it leaves a clearance J between the internal face of its shoulder and the external radial face of the first lug of the clevis, for the purpose of permitting the expansion of all of the parts forming the assembly of the connecting rod 3 with the clevis 4.

The mounting and operation of a connection according to the invention between a connecting rod 3 bearing an eccentric ball joint and a clevis 4 will now be described. The solution of the technical problem which is proposed by the invention consists in the use of monolithic connecting rods with eccentric ball joints, i.e. connecting rods of which the axis of the bore of the ball joint is offset relative to the center of its spherical surface. Thus the use of such an eccentric ball joint, in the first instance, enables mounting clearance of the connecting rod on the axis of the clevis to be compensated and, in the second instance, to be able to apply a pre-stressing to the connecting rod by using a simple torque wrench.

The positioning of the connecting rod takes place in the following manner:
the dog-clutch 14 is positioned in the second lug of the clevis 4 and the connecting rod 3 is positioned so that the bore of the ball joint 10 thereof is substantially aligned with the axis of the bore of the lugs of the clevis,
the shaft 9 provided with the first (disengaged) bushing 11 is introduced via the bores of the clevis 4, the ball joint 10 and the dog-clutch 14, the first bushing bearing, on the one hand, against the external face of the first lug and, on the other hand, against a radial face of the ball joint 10. At the same time, the dog-clutch 14 is positioned in rotation on the shaft 9 so that the first longitudinal extensions 18 thereof penetrate the cutout(s) 13 formed on the corresponding radial surface of the ball joint 10.
the second (engaged) bushing 12 is in turn passed about the shaft 9 and pivoted about said axis until its cutout(s) 15 cooperate with the second longitudinal extension(s) 16 of the dog-clutch 14.
the screw 5 provided with the first washer 7 is slid inside the shaft 9 and the second washer 8 is positioned against the second bushing 12 and then pre-tightening is carried out by positioning the nut 6 on the thread of the screw 5. During this positioning, the second washer 8 is positioned so as to align its flat portion(s) thereon or on those of the second bushing 12. The pre-tightening is carried out so that it holds the elements together but it does not prevent rotation of the disengaged elements relative to one another. It is necessary to provide clearance between the parts so that, on the one hand, it is possible to mount them and, on the other hand, during use it is avoided that they are under stress relative to one another, which would generate wear during the relative movements thereof.
as the ball joint 10 is engaged on the dog-clutch 14, which is itself engaged on the second bushing 12, an action by the torque wrench on the flat portions of the second bushing and the second washer causes a rotation of the ball joint 10 about the shaft 9. As said ball joint is eccentric relative to said shaft 9, the rotation of the ball joint initially causes the compensation of the clearances which potentially exist between the connecting rod 3 and the shaft 9 of the clevis 4 and then, once the clearances have been compensated, the pre-stressing of the connecting rod 3 which makes it possible to avoid the peening of said parts by vibrations occurring on the engine or the aircraft. The use of a torque wrench makes it possible to calibrate the level of pre-stressing applied to the connecting rods.
once the ball joint 10 has been rotated by the angle which provides the desired level of pre-stressing, the tightening of the nut 6 ensures the retention of the assembly by the immobilization of the second bushing due to the clamping of the collar 17 and the radial shoulder of the second bushing 12 on the lug of the clevis 4. The screw, by the shoulders of the first and second bushings 11 and 12 bearing against the lugs of the fork 4, henceforth prevents said bushings from rotating about their axis, and as the ball joint 10 is engaged on the second bushing 12 it is blocked in rotation, as are the bushings.

So as to improve the adhesion of the bushings on the radial faces of the lugs of the clevis, it is conceivable to place splines on the clevis or to create roughness on the shoulders of the bushings on the side where they come into contact with the lugs of the clevis 4.

By way of a variant, it is possible to use a conventional ball joint, having an axis of symmetry which is aligned with that of the shaft 9 of the clevis, and a second bushing 12 which in turn is eccentric, the rotation by the torque wrench of said bushing causing an offset of the shaft 9 parallel with itself and consequently an offset of the ball joint 10 which produces the desired compensation of clearance and pre-stressing of the connecting rod 3.

The invention claimed is:

1. A device for assembly of a suspension member on a casing of a turbo-engine comprising:
a clevis fixed to the casing and comprising first and second coaxially bored lugs;
a shaft traversing the bores of said lugs to which said suspension member is fixed, in a manner which is mobile in radial rotation;
a ball joint surrounding the shaft and fixing said suspension member to said shaft;
a support ring surrounding said shaft, said support ring including a radial shoulder and first and second longitudinal extensions extending from first and second sides of the radial shoulder of said support ring, respectively, said second side of said radial shoulder of said support ring facing a first side of said second lug; and a bushing surrounding said shaft, said bushing including a radial shoulder and a longitudinal extension extending from said radial shoulder of said bushing and including a cutout, said radial shoulder facing a second side of said second lug, wherein said support ring and said bushing are capable of being driven in rotation about an axis of the bores, wherein said ball joint is fixed at one of the ends of said suspension member, and bored along an axis which is offset relative to an axis of symmetry of a spherical part of said ball joint, the axis of rotation of said support ring and said bushing being merged with the axis of said lugs such that the rotation of said support ring and said bushing about the axis of the bore of the lugs causes an offset of the axis of rotation of the suspension member in a direction perpendicular to said axis of the bores, wherein said ball joint includes a cutout on a radial face facing said support ring, said first longitudinal extension of said support ring cooperating with said cutout on said radial face to fix in rotation said ball joint with said support ring about the axis of the bore of said lugs, and wherein said second longitudinal extension of said support ring cooperates with said cutout on said longitudinal extension of said bushing to fix in rotation said support ring with bushing about the axis of the bores of said lugs.

2. The device as claimed in claim 1, wherein said bushing comprises two parallel flat portions positioned on its circumference, permitting its rotation using a tool about the axis of the bore of said lugs.

3. The device as claimed in claim 1, wherein the support shaft is hollow and traversed by an assembly consisting of a screw and a nut capable of providing the clamping of the radial shoulders of said bushing and the ring against the second lug of the clevis, so as to block the rotation of the bushing and the ball joint about the axis of the bore of said lugs.

4. The device as claimed in claim 3, further comprising a washer positioned between the bushing and the nut, said washer comprising two parallel flat portions capable of being positioned opposite flat portions of said bushing.

5. A turbo-engine comprising the device for assembly as claimed in claim 1.

6. The device as claimed in claim 1, further comprising a second bushing surrounding said shaft and including a radial shoulder facing a first side of said first lug.

7. The device as claimed in claim 6, wherein a clearance is provided between said radial shoulder of said second bushing and said first side of said first lug.

* * * * *